United States Patent
Brombach et al.

(10) Patent No.: US 11,898,538 B2
(45) Date of Patent: Feb. 13, 2024

(54) METHOD AND WIND TURBINE FOR DAMPING LOW FREQUENCY OSCILLATIONS IN AN ELECTRICAL SUPPLY GRID

(71) Applicant: Wobben Properties GmbH, Aurich (DE)

(72) Inventors: Johannes Brombach, Berlin (DE); Aramis Schwanka Trevisan, Aurich (DE)

(73) Assignee: Wobben Properties GmbH, Aurich (DE)

( * ) Notice: Subject to any disclaimer, the term of this patent is extended or adjusted under 35 U.S.C. 154(b) by 535 days.

(21) Appl. No.: 17/258,113

(22) PCT Filed: Jul. 3, 2019

(86) PCT No.: PCT/EP2019/067842
§ 371 (c)(1),
(2) Date: Jan. 5, 2021

(87) PCT Pub. No.: WO2020/007909
PCT Pub. Date: Jan. 9, 2020

(65) Prior Publication Data
US 2021/0288500 A1    Sep. 16, 2021

(30) Foreign Application Priority Data
Jul. 6, 2018 (DE) ..................... 10 2018 116 442.4

(51) Int. Cl.
*F03D 7/02* (2006.01)
*H02J 13/00* (2006.01)
(Continued)

(52) U.S. Cl.
CPC .......... *F03D 7/0284* (2013.01); *G05B 17/02* (2013.01); *H02J 3/241* (2020.01); *H02J 3/381* (2013.01);
(Continued)

(58) Field of Classification Search
CPC ....... F03D 7/0284; F03D 7/048; G05B 17/02; H02J 3/241; H02J 3/381; H02J 3/48;
(Continued)

(56) References Cited

U.S. PATENT DOCUMENTS 5,028,804 A * 7/1991 Lauw ........................ H02P 9/42
290/40 C
5,239,251 A * 8/1993 Lauw ...................... H02P 27/05
388/930
(Continued)

FOREIGN PATENT DOCUMENTS

CN    102255325 A    11/2011
CN    103050976 A    4/2013
(Continued)

OTHER PUBLICATIONS

Anderson et al., *Subsynchronous Resonance in Power Systems*, IEEE Press 1990, 290 pages.
(Continued)

*Primary Examiner* — Ziaul Karim
(74) *Attorney, Agent, or Firm* — Seed IP Law Group LLP (57) ABSTRACT

Provided is a method for damping low frequency oscillations, in particular subsynchronous resonances, in an electrical supply grid by way of at least one decentralized production unit connected to the electrical supply grid, in particular a wind turbine or a wind farm, comprising the steps: feeding electrical power by way of the at least one production unit and supplementing the feeding by way of a supplementary component for damping the low frequency
(Continued)

oscillations, wherein the supplementary component is determined depending on a simplified model of a synchronous machine.

16 Claims, 3 Drawing Sheets

(51) Int. Cl.
    *G05B 17/02*     (2006.01)
    *H02J 3/38*     (2006.01)
    *H02J 3/24*     (2006.01)
    *H02J 3/48*     (2006.01)

(52) U.S. Cl.
    CPC .......... *H02J 3/48* (2013.01); *H02J 13/00002* (2020.01); *H02J 2203/20* (2020.01); *H02J 2300/28* (2020.01)

(58) Field of Classification Search
    CPC ............. H02J 13/00002; H02J 2203/20; H02J 2300/28; Y02P 70/50; F05B 2260/84; F05B 2270/337
    See application file for complete search history.

(56) References Cited

U.S. PATENT DOCUMENTS

| | | | |
|---|---|---|---|
| 6,850,426 B2* | 2/2005 | Kojori | H02P 23/0004 |
| | | | 700/44 |
| 8,510,090 B2 | 8/2013 | Hesse et al. | |
| 9,088,241 B2* | 7/2015 | Wu | H02P 21/13 |
| 10,008,966 B2* | 6/2018 | Wu | H02P 21/0007 |
| 2010/0256970 A1 | 10/2010 | Heese et al. | |
| 2013/0027148 A1 | 1/2013 | Hirama | |
| 2013/0170254 A1* | 7/2013 | Letas | H02M 5/42 |
| | | | 363/34 |
| 2013/0176751 A1 | 7/2013 | Olea et al. | |
| 2014/0145541 A1* | 5/2014 | Jalebi | H02K 3/28 |
| | | | 310/198 |
| 2018/0159453 A1 | 6/2018 | Andersen et al. | |

FOREIGN PATENT DOCUMENTS

| | | |
|---|---|---|
| DE | 102006047792 A1 | 4/2008 |
| DE | 102010030093 A1 | 12/2010 |
| WO | 2011/112571 A2 | 9/2011 |

OTHER PUBLICATIONS

Valentin Crastan, "Electrical power supply 1, network elements, modeling, stationary behavior, dimensioning, switching and protection technology", 4th edition, Springer Verlag, Berlin Heidelberg, 2015, pp. 247, 248 (with English machine translation, 13 pages).

Raouia Aouini et al., "Virtual Synchronous Generators Dynamic Performances", 2014 IEEE, 6 pages.

* cited by examiner

METHOD AND WIND TURBINE FOR DAMPING LOW FREQUENCY OSCILLATIONS IN AN ELECTRICAL SUPPLY GRID

BACKGROUND

Technical Field

The present invention relates to a method for damping a low frequency oscillation, in particular subsynchronous resonances in an electrical supply grid. The present invention also relates to at least one decentralized production unit for carrying out a damping of this type.

Description of the Related Art

An electrical supply grid generally has a nominal line frequency of 50 Hz or 60 Hz. This nominal line frequency can also be referred to as a system frequency. The electrical supply grid can also be referred to as a supply grid or grid in a simplified and synonymous manner.

Low frequency oscillations can occur in the supply grid which have frequencies which are below the nominal line frequency. These oscillations are often referred to as subsynchronous resonances (SSR) or subsynchronous frequencies. For this purpose, in 1990, the Institute of Electrical and Electronics Engineers (IEEE) published a following formal definition for subsynchronous resonance:

"Subsynchronous resonance is an electrical system state in which an energy exchange between an electrical network and a generator set takes place at one or more natural frequencies of the combined system that are below the synchronous frequency of the system", P. M. Anderson, B. L. Agrawal, J. E. Van Ness: "Subsynchronous Resonance in Power Systems", IEEE Press 1990

One problem which can occur in a supply grid is that the low frequency oscillations can excite or amplify mechanical vibrations of synchronous generators directly coupled with the electrical supply grid. This can result in damage to the generators. If they are disconnected from the electrical supply grid for protection, this can result in a weakening of the electrical supply grid.

Low frequency pendulum oscillations in the range of a few hertz can also occur in the supply grid between grid sections, i.e., a low frequency oscillation between a first grid section in Germany and a second grid section in France, for example. Pendulum oscillations of this type can also result in partial grid disconnections in the supply grid. In the worst case, it can result in a blackout.

Due to the fact that in many countries the number of large power stations is decreasing, while decentralized converter-based generators such as wind turbines or photovoltaic installations are substituted, decentralized converter-based generators of this type are also becoming increasingly important for supporting the electrical supply grid.

In this case, the structure of the electrical supply grid can also change. The electrical supply grid is also subject to constant changes as a result of switching on and off procedures, maintenance work on supply lines or as a result of weather conditions. This also means that network capacities and line inductances or line impedances may change constantly overall. As a result, the low frequency oscillations may also change continuously, which makes their detection and damping difficult.

Since wind farms form a part of the electrical supply grid and can significantly influence the network properties, they can therefore contribute to stabilizing the power systems or the supply grid and can be used as a means for damping undesired subsynchronous resonances. However, wind farms of this type must also be able to adapt to the changed network properties with respect to the low frequency oscillations.

In the priority application for the present application, the German Patent and Trademark Office has researched the following prior art: DE 10 2006 047 792 A1, US 2018/0159453 A1 and CN 102255325 A.

BRIEF SUMMARY

Provided is damping low frequency oscillations, in particular subsynchronous resonances, by means of a decentralized production unit, in particular to improve a damping of this type in comparison to known methods.

A method is proposed. It is provided for damping low frequency oscillations, in particular subsynchronous resonances, in an electrical supply grid. Low frequency oscillations of this type are oscillations which have a lower frequency than a nominal line frequency. In particular, the frequency of low frequency oscillations of this type is less than half the nominal line frequency or reaches up to half the nominal line frequency. In a 50 Hz grid, the frequency of low frequency oscillations of this type is therefore preferably less than 25 Hz and correspondingly it is preferably less than 30 Hz in a 60 Hz grid.

In particular, the low frequency oscillations can have values of 1 Hz and less. However, they can also reach up to five times the value of the nominal line frequency. Oscillations with a frequency of a maximum of five times the value of the nominal line frequency, preferably with a frequency which corresponds to no more than the nominal line frequency, are here referred to as low frequency oscillations. In particular, the low frequency oscillation does not have a frequency which corresponds to a multiple of the nominal line frequency. It should be noted that examining and taking into account low frequency oscillations particularly serves to examine or ensure system stability of the electrical supply grid. This is different from assessing the network quality or signal quality of the voltage signal in the electrical supply grid, in the case of which harmonic waves are particularly important.

Damping is carried out by at least one decentralized production unit connected to the electrical supply grid. A decentralized production unit of this type can in particular be a wind turbine or a wind farm. A wind farm correspondingly comprises a plurality of wind turbines.

Provision is now made for electrical power to be fed into the electrical supply grid by way of the at least one production unit. This feeding is supplemented by a supplementary component for damping the low frequency oscillations. A special supplementary component is therefore provided in addition to the completely normal feeding of electrical power, which supplementary component can in particular be superimposed on the fed electrical power, i.e., which is fed normally.

For this purpose, it is proposed that the supplementary component is determined depending on a simplified model of a synchronous machine. It is particularly important here that a synchronous machine responds to low frequency oscillations in a physically conditioned manner and this physical response is essentially directed in such a way that it can counteract the low frequency oscillations. This particularly concerns a physically conditioned behavior which results if a synchronous machine of this type is directly coupled with the electrical supply grid. This is particularly applicable to synchronous generators which are directly coupled with the electrical supply grid for feeding electrical power, as is usually the case in large power stations.

It has been recognized that this possible damping property of the synchronous machine can be transmitted to a decentralized production unit via a model. In this case, it has been recognized that it is not necessary to completely emulate a synchronous machine, but rather it is more appropriate to use a simplified model. This simplified model can be restricted to this possible damping property which is to be utilized. Such a simplified model of a synchronous machine is therefore taken as a basis and the supplementary component is determined depending on this. It is noted that a synchronous machine is a generic term for synchronous motors and synchronous generators. Synchronous generators can usually also work as synchronous motors, and vice versa. The function of a generator is the main focus here and explanations of synchronous generators are essentially also to be understood as explanations of synchronous machines here, and vice versa.

One particular problem when damping low frequency oscillations is detecting these low frequency oscillations at all. In particular in online detection, which therefore does not permit longer identification or observation, a low frequency oscillation can, at least regularly, only be detected very inaccurately. If it is determined by means of a frequency analysis, for example, such a determination can take a relatively long time, possibly too long in order to still be able to carry out damping in a manner which is useful. Moreover, a low frequency oscillation of this type can also change relatively quickly or frequently.

If a time-consuming detection of the low frequency oscillation is therefore initially carried out, a control adapted to the low frequency oscillation detected in this way may possibly no longer be up to date when it is used, because the low frequency oscillation may have already changed by then. For this reason, it is proposed that this simplified model of the synchronous machine is used, which in fact responds to the low frequency oscillations in a substantially similar manner to a synchronous machine, without them having to be explicitly identified or detected for this purpose. In particular, the simplified model can be realized by a corresponding equivalent circuit and an equivalent circuit of this type then responds directly to electrical phenomena, without them having to be initially explicitly detected or determined for this purpose.

It is preferably proposed that the supplementary component is a current which is fed in a supplementary manner. This supplementary fed current is thus determined depending on the simplified model of the synchronous machine and then fed in a supplementary manner accordingly. The feeding of electrical power, i.e., the normal feeding of electrical power, can also take place via the specification of an electrical current. The supplementary fed current can be superimposed on this current for feeding the electrical power. In particular, it can be assumed in a simplified manner that the current for feeding the electrical power substantially has a constant, at least quasi-stationary effective value, whereas the supplementary component, i.e., the current which is fed in a supplementary manner, varies in its effective value, that is to say as it results from the simplified model.

Additionally or supplementary, it is proposed according to one embodiment that the supplementary component is determined by damping properties of the synchronous machine on which the simplified model is based being emulated at output terminals of the production unit. A circuit which represents the simplified model can particularly be provided here at the output terminals. These output terminals can particularly be output terminals of an inverter arrangement, which is also otherwise used to feed into the electrical supply grid, i.e., via which the electrical power is therefore fed into the electrical supply grid. An electrical signal of the electrical supply grid, or a signal which is representative thereof, is then also applied to the output terminals.

A representative signal can then be assumed particularly if a transformer is arranged between these output terminals and the electrical supply grid, for example. Nevertheless, signals of this type, particularly the voltage, of the electrical supply grid are also transmitted via a transformer of this type to the output terminals. If the electrical circuit for emulating the damping properties of the synchronous machine on which the simplified model is based is then connected to the output terminals there, these signals of the electrical supply grid act on this circuit or the signals representing these signals act on this circuit, which can also be referred to as an emulation circuit here. The circuit then responds directly to these electrical signals and behaves similar to the synchronous machine on which the model is based, at least with respect to the damping properties, and can thus achieve damping without it having been necessary to detect the low frequency oscillation.

According to one embodiment, it is proposed that the simplified model of the synchronous machine reproduces an oscillation damping property of a synchronous machine, in particular an oscillation damping property of a damper cage of a synchronous machine with a damper cage. The simplified model is therefore focused on the oscillation damping property of the synchronous machine. In particular, the oscillation damping property of a damper cage is considered here. A damper cage is essentially designed like the cage of a cage rotor of an asynchronous machine. The damper cage is also designed on the rotating part of the synchronous machine, that is to say the rotor, i.e., the electrodynamic rotor. The electrodynamic rotor can also be referred to as an armature in a simplified manner, in order to avoid confusion with an aerodynamic rotor.

In a damper cage of this type, a current can be induced in the damper cage by rotation of the armature, with which the damper cage is also rotated, which current in turn builds up a magnetic field. The particularity of a damper cage of this type, which is in fact also an effect in an asynchronous machine, is that changes in the electrical supply grid electrically connected thereto, i.e., particularly voltage changes, results in currents and thus in magnetic fields in this damper cage, which counteract the triggering change by way of the electrical supply grid. This effect is utilized here and thus forms an oscillation damping property. This oscillation damping property is therefore utilized by the simplified model of the synchronous machine.

Additionally or alternatively, it is proposed that the vibratory components of the synchronous machine on which the simplified model is based are not depicted or only depicted in a reduced manner. It has been recognized here that oscillation damping properties of a synchronous machine can be adapted in the simplified model, wherein by using the simplified model, the focus can be on the damping properties. Vibrating or vibratory components or properties of the synchronous machine can be omitted or they can be modified in such a way that they vibrate less.

The underlying idea here is also that the simplified model is not used for the entire feeding of electrical power, but rather only for determining a supplementary component. In particular, a property of the synchronous machine which relates to the feeding of electrical power as a key component or as a predominant component does therefore not also have to be taken into account. The feeding of electrical power, i.e., the normal feeding of electrical power without taking into account a damping property or without taking into account the supplementary component, can furthermore be carried out independent of a model of a synchronous machine. This therefore makes use of the possibility that only the properties which are necessary for damping are carried over into the model or are depicted in the model from the behavior of the synchronous machine.

In particular, it is proposed that the simplified model of the synchronous machine only reproduces one oscillation damping property of a damper cage of a synchronous machine with a damper cage. It is therefore proposed here to only implement this damper cage in the model or to implement its properties.

The decentralized production unit preferably feeds into the electrical supply grid by means of an inverter with an inverter output via a network connection point. For this purpose, it is proposed that the supplementary component is determined by at least one instantaneous value of a measurement voltage constantly being received at the inverter output, in the electrical supply grid or at another point in between, in particular at the network connection point, and entered into the simplified model of the synchronous machine. A response of the simplified model to the instantaneous values of the measurement voltage is then used as a supplementary component. A simplified model is therefore taken as a basis and it constantly receives current measured values which can be measured at the inverter output, i.e., in particular as often and as quickly as a sampling rate of a measurement voltage allows. In this respect, the simplified model is as good as connected to this inverter output but can instead actually also be realized as a model in a microprocessor or process computer, and this microprocessor or other kind of process computer can correspondingly use the measurement voltage via the received instantaneous values as input variables of the simplified model.

The response of the simplified model is then the supplementary part and it can in this case also be output as an output variable of a model in the microprocessor or process computer. A digital output is also possible here and the actual implementation of the supplementary component can therefore then also take place by way of the inverter or a further inverter. As a result, the entire feeding of electrical power into the electrical supply grid, i.e., including a supplementary component, can be carried out by way of an inverter.

In this case, the simplified model helps to generate a supplementary component for damping but at the same time leaves complete control of the feeding to an inverter. In particular, feeding electrical power, i.e., also including the supplementary component, can be implemented by feeding a corresponding current. This current is then made up of a component for feeding the electrical power, which is therefore not provided for damping, and the supplementary component.

According to one embodiment, it is firstly assumed that the electrical supply grid has a line frequency, which of course should essentially always be the case. For this purpose, it is then proposed that a generator voltage is emulated in the simplified model, in particular for oscillation-free operation of the synchronous machine on which the simplified model is based, if this synchronous machine is operated with the line frequency. In this respect, the simplified model has a generator voltage. This is emulated and indeed in such a manner that the operation is oscillation free. The generator voltage is therefore emulated in such a way and then acts accordingly in the simplified model such that there results an oscillation-free operation if possible. This model with the generator voltage emulated in this way then responds with a damping signal, if there are corresponding low frequency oscillations, i.e., if low frequency oscillations of this type are superimposed on the ideal sinusoidal line frequency.

In the model, a behavior is emulated in which an energy exchange takes place between rotating mass and grid. This energy exchange results from a corresponding power swing, that is to say the oscillation in the grid. A corresponding pendulum frequency is therefore also present. The emulated energy exchange causes a power loss in the model via a corresponding ohmic (resistive) component, that is to say particularly in the damper cage. This power loss is the damping signal or is output as a damping signal and the supplementary component can be determined and supplemented, i.e., fed in a supplementary manner, accordingly.

According to one embodiment, it is proposed that an active power basic component is specified and fed via an active power control, and that the active power control works independent of the determination of the supplementary component. The active power basic component is therefore specified and fed independent of the determination of the supplementary component. However, this may include that a total fed-in active power can be made up of this active power basic component and the supplementary component or a component thereof. However, the normal active power feeding and the feeding of the supplementary component, at least the determination of these variables, in each case, are decoupled from one another. Damping via determining the supplementary component can therefore be carried out independent of specifying the active power basic component.

According to one configuration, it is proposed that determining and supplementing the supplementary component depending on the instantaneous values of the measurement voltage takes place in such a way that a supplementary component only results if the measurement voltage deviates from a sinusoidal voltage without low frequency oscillation. It is particularly proposed here that the supplementary component automatically results if the measurement voltage deviates from the sinusoidal voltage without low frequency oscillation. The simplified model of a synchronous machine is particularly suitable for this purpose, which model can include or take into account a uniform rotational movement and a sinusoidal signal is produced depending on this. A sinusoidal signal of this type is ideally produced in such a way that this sinusoidal signal corresponds to a sinusoidal voltage. In particular, it corresponds to a sinusoidal voltage which is applied to corresponding output terminals of the inverter. The sinusoidal signal can of course also correspond to a corresponding representative sinusoidal signal.

In particular, it is possible here that the line voltage, i.e., the voltage in the electrical supply grid, is measured and compared with this sinusoidal signal of the simplified model. It is also possible here that instead of the line voltage, a value is used which is representative thereof. This can be a voltage, for example, which is changed compared to the line voltage by a transformer with a known transmission ratio.

However, a measurement signal which forms the output of a measuring transformer of a voltage measurement can also be a representative signal. A correspondingly digitalized signal for digital processing in a process computer is also possible.

In any case, this sinusoidal signal of the simplified model is compared with the sinusoidal voltage, particularly by difference formation in a microprocessor or a different process computer. In this case, the instantaneous values are each compared here, i.e., not effective values. If the result of this comparison is that the signals are the same, i.e., if the constant difference of the instantaneous values is zero, there is therefore no supplementary component. However, if there are deviations, they can be used for determining a supplementary component. In this respect, this automatically then results in the supplementary component, since, according to the example, the sinusoidal signal constantly moves along with the sinusoidal voltage and deviations result in the supplementary component, without firstly having to explicitly identify a low frequency oscillation. The deviation from the sinusoidal voltage alone is sufficient here in order to generate the supplementary component. Implementation can take place by means of corresponding programming or circuitry or combination thereof. In particular, the model is set up in such a way that the deviations result in an emulated energy exchange in the model, which results in damping by ohmic losses and this is then converted from the model into the supplementary component. In particular, this lossy, oscillating energy exchange is used as a supplementary part for feeding, or the supplementary component is calculated therefrom, wherein it is preferably proportional to the lossy, oscillating energy exchange or the resulting losses. An oscillating feeding of this type also includes of course that the sign of the supplementary component can change. This applies to all embodiments.

According to one embodiment, it is proposed that:
for determining the supplementary component, a or the measurement voltage is constantly received in three phases and transformed into d/q components;
the d/q components of the measurement voltage are in each case provided to a d submodel and a q submodel of the simplified model, wherein the d submodel depicts the behavior of a d component and the q submodel the behavior of a q component of the synchronous machine on which the simplified model is based;
a d component and a q component of a current is in each case received or formed as a response of the d submodel or the q submodel to the d or q components of the measurement voltage;
the d and the q components of the current are transformed back into a three-phase supplementary current; and
the supplementary current obtained in this way is additionally fed by the production unit as a supplementary component.

A simplified model is therefore proposed which works with the transformed d/q components. This makes it possible, on the one hand, to consider the three phases of the three-phase measurement voltage together. Moreover, the d/q components can advantageously be taken into account in a simplified model of a synchronous machine, if this simplified model also emulates the synchronous machine in d/q components. The d/q components of the measurement voltage are transformed into a corresponding simplified model of the synchronous machine accordingly, that is to say into the d submodel or the q submodel.

This then results in the d/q components of a current and this can be used for damping. For this purpose, it is firstly transformed back from its d/q components into a three-phase supplementary current and this three-phase supplementary current then forms the supplementary component. This can be superimposed on an active power basic component. It should be noted that a transformation into d/q components and back again is not necessary for determining the active power basic component. In this respect, the supplementary component, particularly the supplementary current can be determined independent of the active power basic component.

According to one embodiment, which is particularly based on the embodiment described previously but may also deviate from it, it is proposed that:
the simplified model for an input voltage transformed into d/q components, in particular a measurement voltage, has a longitudinal damper resistance for a d component of the transformed input voltage and a transverse damper resistance for a q component of the transformed input voltage, wherein in the simplified model
the d component of the transformed input voltage is applied to the longitudinal damper resistance and results in a first power loss, which is received as a longitudinal power signal, and
the q component of the transformed input voltage is applied to the transverse damper resistance and results in a second power loss, which is received as a transverse power signal, and
the supplementary component is generated from the longitudinal and transverse power signal, in particular by retransformation of the longitudinal and transverse power signals provided in d/q components into a three-phase power signal.

The input voltage is therefore transformed into d/q components and the d/q components then work in a corresponding model. The model includes the longitudinal damper resistance and the transverse damper resistance, for this purpose the model can particularly also be divided into two submodels, that is to say a submodel for the d component and a submodel for the q component. These two submodels can also be referred to or designed as d submodel and q submodel, or as a dynamic equivalent circuit diagram of the longitudinal axis of a synchronous machine and as a dynamic equivalent circuit diagram of the transverse axis of a synchronous machine.

There then results in each of the submodels a corresponding power loss component, that is to say at the longitudinal damper resistance and the transverse damper resistance. This is received as a corresponding signal, namely as a longitudinal and transverse power signal, and is transformed back. There results a three-phase signal which corresponds to the supplementary component and the supplementary component is then generated and fed accordingly. The longitudinal damper resistance and the transverse damper resistance particularly describe a behavior of a damper winding or a damper cage of a synchronous machine.

To receive this longitudinal and transverse power signal can also mean to consider a corresponding current through the transverse power resistance and the longitudinal power resistance in each case. The current transformed back from these two signals accordingly can then form the supplementary component, or at least be proportional to it. In this case, it should be noted that a power feeding is frequently carried out in such a way that for a given voltage, namely the line voltage or an equivalent voltage, a current which is to be fed is specified which is proportional to the power which is to be fed.

A decentralized production unit, in particular a wind turbine or a wind farm is also proposed. In this case, a decentralized production unit of this type is prepared for feeding electrical power into an electrical supply grid and for damping low frequency oscillations, in particular subsynchronous resonances, in the electrical supply grid. It is proposed that the decentralized production unit comprises the following:

- a feeding unit for feeding electrical power into the electrical supply grid; and
- a determination unit for determining a supplementary component for damping the low frequency oscillations, wherein
- the determination unit has a model section and said model section has a simplified model of a synchronous machine, in order to determine the supplementary component depending on the simplified model of the synchronous machine, and wherein
- the decentralized production unit, in particular the feeding unit, is prepared to additionally feed the supplementary component into the electrical supply grid, in order to damp the low frequency oscillations.

The decentralized production unit therefore has, in addition to a feeding unit for feeding electrical power into the electrical supply grid, a determination unit which determines a supplementary component for damping the low frequency oscillations. For this purpose, it has a model section with a simplified model of a synchronous machine. The supplementary component is determined by means of this simplified model and can also be fed into the electrical supply grid by the decentralized production unit. In this case, the feeding can take place in such a way that the feeding unit feeds both the electrical power, i.e., in particular an active power basic component, and the supplementary component. Both of them can be superimposed in a common fed-in current.

In particular, it is proposed that the decentralized production unit works in such a way as has been explained previously according to at least one embodiment of a method for damping low frequency oscillations.

In particular, it is proposed that a control unit (controller) is provided, on which a method of this type is implemented. A control unit of this type can include the determination unit for determining the supplementary component. The control unit can be designed as a process computer.

An inverter is preferably provided, in particular as a feeding unit, which inverter has an inverter output, in order to feed into the electrical supply grid via a network connection point. Furthermore, it is proposed that a measuring unit is provided for detecting a measurement voltage at the inverter output, in the electrical supply grid, or at another point in between, in particular at the network connection point, in order to enter this measurement voltage into the simplified model of the synchronous machine. The supplementary component is then determined by at least one instantaneous value of the measurement voltage constantly being entered into the simplified model of the synchronous machine and a response of the simplified model to the instantaneous values of the measurement voltage is used as a supplementary component.

The voltage in the electrical supply grid or a representative value for it can therefore be detected via the measuring unit and the supplementary component for damping possible low frequency oscillations can then be directly determined depending on this. This makes it possible to respond directly to the line voltage and the manner in which this is to take place can be specified via the simplified model of the synchronous machine.

It is also achieved here that a supplementary component for damping can be generated via this direct input of this measurement voltage or corresponding measured variable into the simplified model, without a low frequency oscillation having to be explicitly recognized or identified. This makes it possible for the entire process and thus the production unit for damping to work continuously and online.

It is preferably also proposed that the determination unit, in particular the model section and/or its simplified model:

- has a transformation unit, in order to transform a or the measurement voltage which is constantly received in three phases into d/q components for determining the supplementary component;
- has a d submodel and a q submodel of the simplified model, wherein the d/q components of the measurement voltage are in each case provided to the d submodel or the q submodel of the simplified model, wherein the d submodel depicts the behavior of a d component and the q submodel the behavior of a q component of the synchronous machine on which the simplified model is based;
- has a receiving section, in order to in each case receive or form a d component and a q component of a current as a response of the d submodel or the q submodel to the d or q component of the measurement voltage;
- has a retransformation unit, in order to transform the d and the q components of the current back into a three-phase supplementary current; and
- the production unit is prepared for the supplementary current obtained in this way to be additionally fed by the production unit as a supplementary component.

The determination unit, in particular the model section or its simplified model in particular work in such a way or have such structures as follows in the explanations for at least one embodiment of a method described previously for damping low frequency oscillations. In particular, a model of this type can be stored or implemented in the determination unit or the model section or the simplified model which transforms a measurement voltage or representative variable into d/q components. Moreover, provision is made there for the d/q components of the measurement voltage to be provided to a d submodel or a q submodel in each case, wherein the d submodel depicts the behavior of a d component and the q submodel the behavior of a q component. Furthermore, provision is made for a d component and a q component of a current to be received or formed in each case as a response of the d submodel or q submodel to the d or q components of the measurement voltage. This can also be part of the d submodel or q submodel in each case. Furthermore, provision is made for the d and the q components of the current to be transformed back into a three-phase supplementary current and for the supplementary current obtained in this way to be able to be additionally fed by the production unit as a supplementary component.

BRIEF DESCRIPTION OF THE SEVERAL VIEWS OF THE DRAWINGS

The invention shall now be explained in greater detail hereinafter in an exemplary manner using embodiments with reference to the accompanying figures.

DETAILED DESCRIPTION

Figure 1:
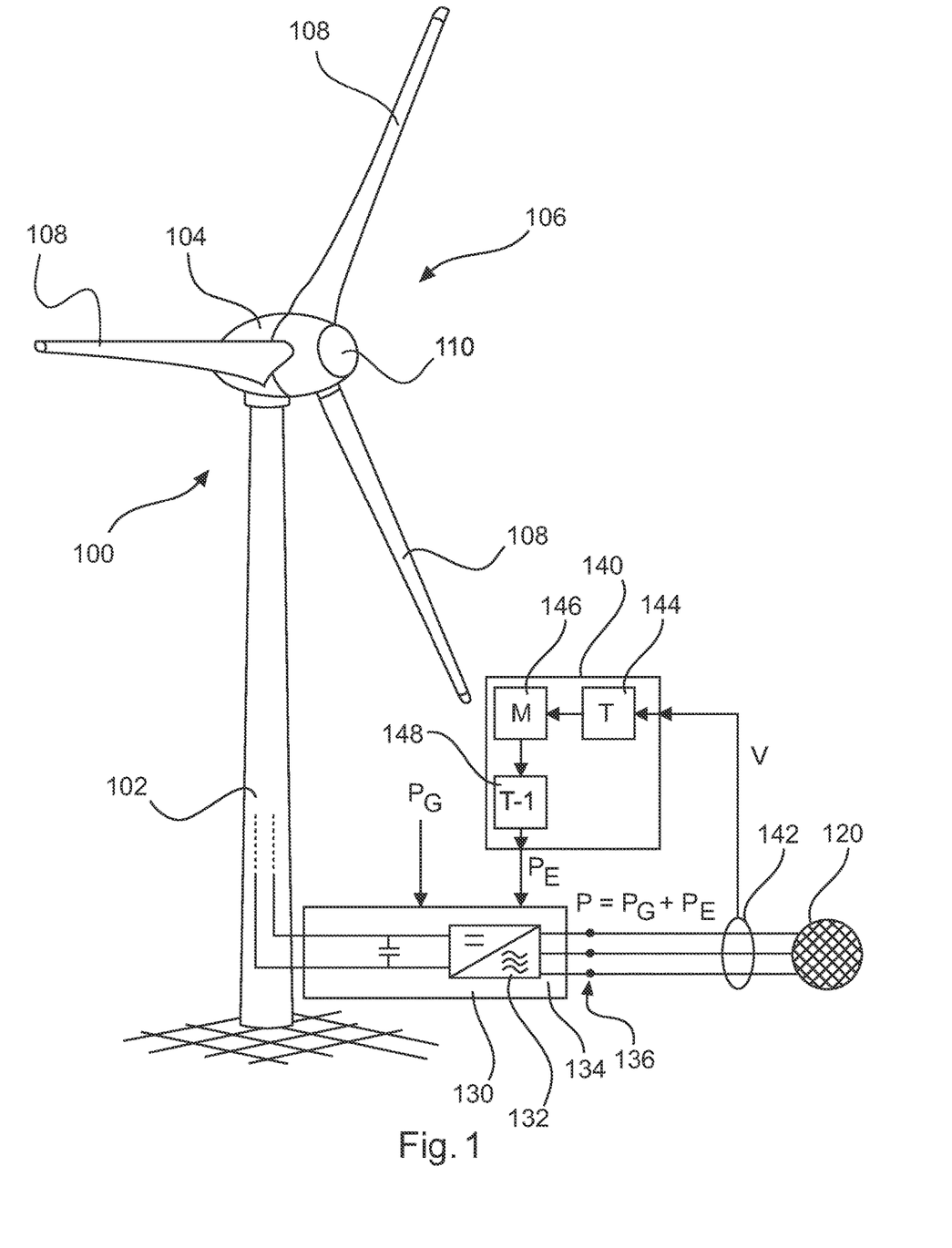
FIG. 1 shows a wind turbine in a perspective representation.

FIG. 1 shows a wind turbine 100 with a tower 102 and a nacelle 104. A rotor 106 with three rotor blades 108 and a spinner 110 is arranged on the nacelle 104. The rotor 106 is transferred into a rotational movement by the wind during operation and thus drives a generator in the nacelle 104.

The wind turbine has a feeding unit 130 for feeding electrical power into an electrical supply grid 120. It can have an inverter 132 which can emit electrical power at an inverter output 134, particularly by emitting a three-phase current. The inverter output 134 can be connected to output terminals 136 which can form the output of the feeding unit 130 and therefore also the wind turbine 100. The wind turbine 100 therefore also forms a decentralized production unit. As represented in FIG. 1 in a simplified manner, the output terminals 136 can be directly connected to the electrical supply grid 120, or further elements such as a circuit breaker and/or a transformer can be arranged in between.

A determination unit (controller) 140 is provided for determining a supplementary component. This determination unit can receive instantaneous values of the voltage of the electrical supply grid as an input variable, which instantaneous values are received here by way of example by the measuring device (voltmeter or multimeter) 142 indicated and are entered into the determination unit 140. For illustrative purposes, these instantaneous values, which relate to all three phases, are indicated as V. In the embodiment shown, these values detected in this way are firstly provided to a transformation unit 144. Said transformation unit carries out a transformation into d/q components, in order to then evaluate them in a model section 146, in which the simplified model can be implemented, in order to finally obtain a q component of a current and a d component of a current as a response of the model section 146 in which the simplified model is implemented. This result can be received by a receiving section (receiver), which is part of the model section 146 here.

The components of the current obtained in this way on the response of the simplified model, which is implemented in the model section 146, are then provided to a retransformation unit 148 and the result can then be a supplementary component $P_E$, which is then provided as a value to the feeding unit 130 for implementation. A power is indicated here as a supplementary component $P_E$. Alternatively, however, a current, i.e., a set point for a current, particularly including phase position, can also be emitted and transferred to the feeding unit 130.

The feeding unit 130 therefore obtains, by way of this supplementary component, a set point of a supplementary component which is to be fed in. This supplementary component serves to damp any low frequency oscillations in the electrical supply grid.

The active power basic component $P_G$ can be specified for controlling the actual feeding of electrical power, depending on necessary or desired damping. The feeding unit 130, in particular the inverter 132, then generates an output power or a corresponding current which can correspond to the sum of this active power basic component $P_G$ and the supplementary component $P_E$. However, it is important to note that at least the supplementary component $P_E$ is to be assumed to be a changing variable. In particular, it can vibrate with a frequency which can correspond to the frequency of the low frequency oscillation which is to be damped, to give an illustrative example. However, it is also possible that the low frequency oscillation has a plurality of low frequency oscillation components, that is to say with different frequencies but which themselves are each also low frequency, i.e., in particular are less than half the size of the nominal line frequency.

Figure 2:
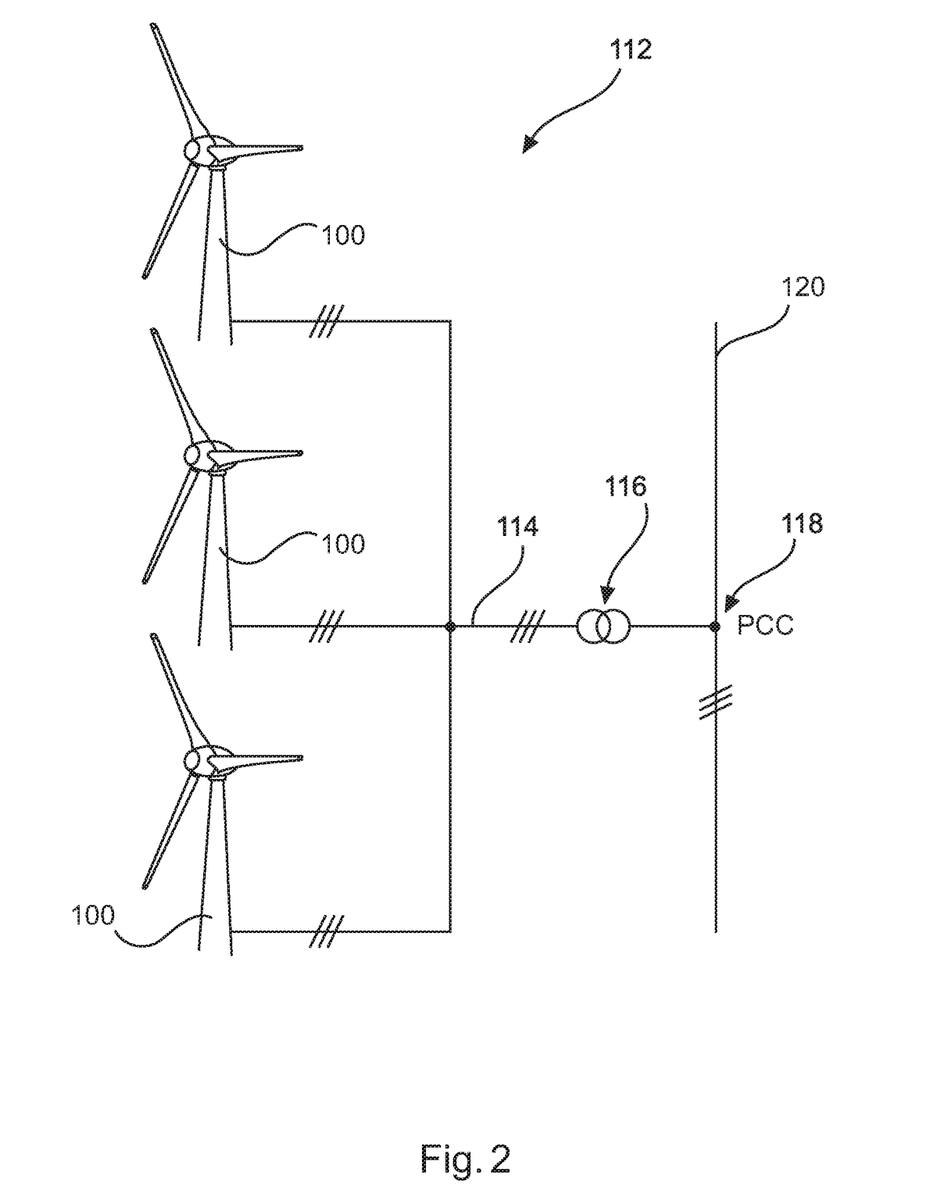
FIG. 2 shows a wind farm in a schematic representation.

FIG. 2 shows a wind farm 112 with three wind turbines 100 by way of example, which can be identical or different. The three wind turbines 100 are therefore representative of essentially any number of wind turbines of a wind farm 112. The wind turbines 100 provide their power, that is to say in particular the electricity produced via an electrical farm network 114. In this case, the currents or power produced in each case from the individual wind turbines 100 is added up and a transformer 116 is usually provided which boosts the voltage in the farm, in order to then feed it into the supply grid 120 at the feeding point 118, which is also commonly referred to as PCC. FIG. 2 is merely a simplified representation of a wind farm 112 which does not show any control system, for example, even though a control system is of course present. The farm network 114 can also be configured differently, for example, by a transformer also being present at the output of each wind turbine 100, for example, to mention only one other exemplary embodiment.

Figure 3:
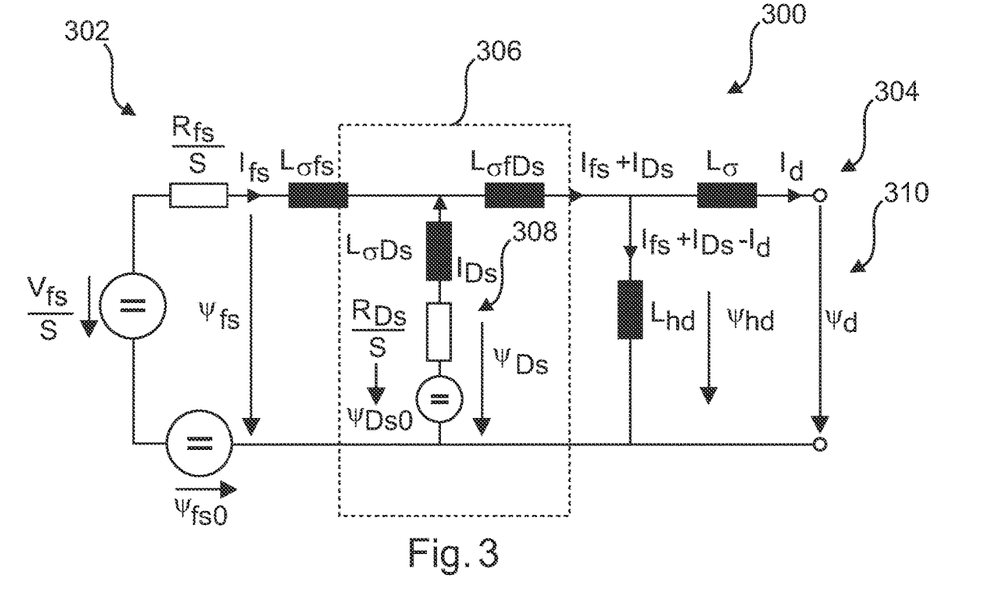
FIG. 3 shows a dynamic equivalent circuit diagram of the longitudinal axis of a synchronous machine with a damper winding.
Figure 4:
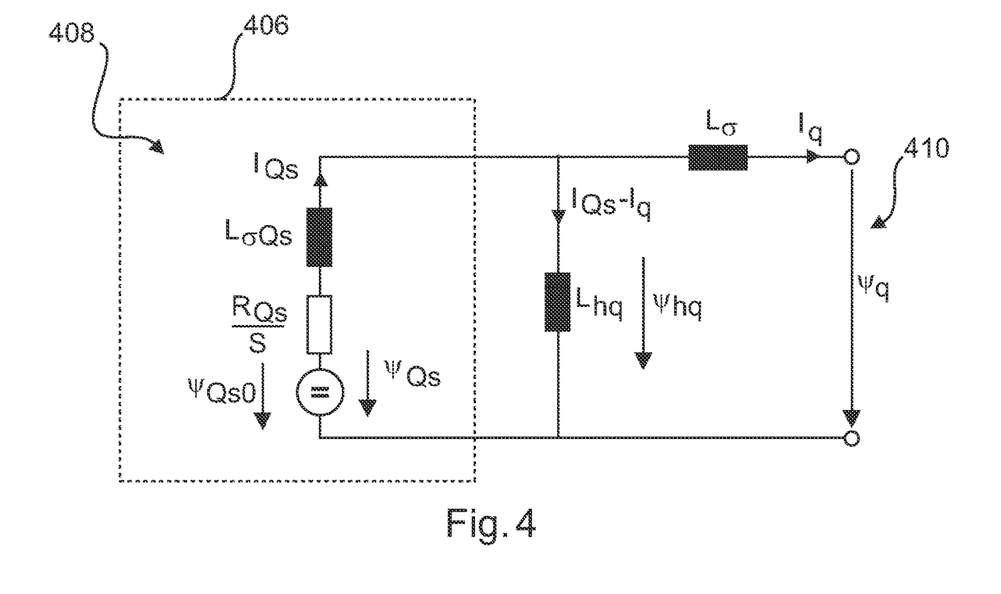
FIG. 4 shows a dynamic equivalent circuit diagram of the transverse axis of a synchronous machine with a damper winding.

FIGS. 3 and 4 each show a dynamic equivalent circuit diagram, namely the longitudinal axis of a synchronous machine with a damper winding according to FIG. 3 and the transverse axis of the synchronous machine with a damper winding according to FIG. 4.

FIG. 3 therefore shows the dynamic equivalent circuit diagram of the longitudinal axis, which is here referred to in a simplified manner as a longitudinal equivalent circuit diagram 300, whereas the dynamic equivalent circuit diagram of the transverse axis according to FIG. 4 is referred to in a simplified manner as a transverse equivalent circuit diagram 400. In the longitudinal equivalent circuit diagram 300, the behavior of the synchronous machine is substantially reproduced by a transformed resistance of the field winding $R_{fs/s}$, a voltage source of a transformed excitation voltage $V_{fs/s}$, a voltage source of a linked flux $\Psi_{fs0}$ and the leakage inductance $L_{\sigma fs}$ in a rotor section (circuit) 302. In a simplified manner, the flux linkage $\Psi_{fs0}$ also delineated can also be used as a left input variable.

Moreover, a stator section 304 is indicated. This stator section (circuit) 304, which is thus directed at the longitudinal component of the synchronous generator model, substantially has a leakage inductance $L_\sigma$ and a main inductance $L_{hd}$ of the longitudinal component. The main flux linkage $\Psi_{hd}$ arises here accordingly.

A damper section (circuit) is also provided in this longitudinal equivalent circuit diagram 300, which is referred to as a longitudinal damper section (circuit) 306 here. The longitudinal damper section 306 has a damper leg 308 which includes a longitudinal damper inductance $L_{\sigma Ds}$, a transformed longitudinal damper resistance $R_{Ds/s}$ and a voltage source of a damper flux linkage $\Psi_{Ds0}$. A longitudinal damper leakage inductance $L_{\sigma f Ds}$ is also provided.

An equivalent circuit diagram of this type including the currents which are delineated is known in principle and the longitudinal damper section 306 is particularly relevant here and is intended to be used in a simplified model. This longitudinal damper section 306 can essentially result in a damping in a conventional manner, which damping can be set in particular for a signal which can be applied to the longitudinal input 310. As a result, a damping effect can then also be achieved there for an input variable which corresponds to the flux linkage $\Psi_d$ represented there.

The transverse equivalent circuit diagram 400 from FIG. 4 therefore does not have a rotor section (circuit) and the equivalent circuit diagram is substantially limited to the transverse main inductance $L_{hq}$ and the leakage inductance $L_\sigma$. A transverse damper section (circuit) 406 is also present which essentially only has one damper leg 408, in which the transverse damper inductance $L_{\sigma Qs}$, the transformed transverse damper resistance $R_{Qs/s}$ and a voltage source of a linked transverse damper flux $\Psi_{Qs0}$ is present. It is also substantially important here to utilize the property of the damper section, namely here the transverse damper section (circuit) 406, for damping. For this purpose, a corresponding signal can essentially be applied to the transverse input 410, namely where the transverse flux linkage $\Psi_q$ is delineated in FIG. 4.

In this respect, the longitudinal equivalent circuit diagram 300 and the transverse equivalent circuit diagram 400 also form a d submodel and a q submodel and together a complete model. These two submodels can be used as follows for using them to determine a supplementary part. A measurement signal, as received with the measuring device 142 from FIG. 1, for example, can firstly be transformed into a d and a q component. The d component can then be applied to the longitudinal input 310 and the q component to the transverse input 410. In both cases, there is a response in both equivalent circuit diagrams, as a result indeed also a current, such as the longitudinal current $I_d$ in the longitudinal equivalent circuit diagram 300 and the transverse current $I_q$ in the transverse equivalent circuit diagram 400.

These currents are then set at the longitudinal input 310 or transverse input 410 accordingly and can be transformed back together, so that there results a common value from these resulting d and q components, namely in particular a supplementary component, as indicated in FIG. 1 as a supplementary component $P_E$. A damping can then be performed with this supplementary component $P_E$, namely particularly a damping of low frequency oscillation.

The substantial damping property results here particularly from a power decoupled via the two resistances $R_{Ds}$ and $R_{Qs}$, which essentially is converted into heat with an actual damper cage, which is essentially emulated here. This power is modulated onto the inverter signal as a supplementary component.

Low frequency oscillations of this type can be damped effectively via the described application of the transformation into d and q components and applying them to the corresponding equivalent circuit diagram and the retransformation of the resulting d and q components. As has been recognized, this is due to the fact that such a damper behavior of a damper cage is suitable for such a damping of low frequency oscillations of this type. The proposal was made accordingly. These two equivalent circuit diagrams, i.e., the longitudinal equivalent circuit diagram 300 and the transverse equivalent circuit diagram 400, therefore serve as a simplified model. In particular, the simplification lies in the fact that further elements, such as further leakage inductances, for example, have not been taken into account. A simplification can also lie in the fact that the transformed voltage $V_{fs/s}$, as well as the flux linkages, particularly $\Psi_{fs0}$, $\Psi_{Ds0}$ and $\Psi_{Qs0}$, are specified as constant values.

The transformation into d and q components also takes into account a speed of the modulated synchronous machine. This speed can be specified as a constant value. As a result, this makes it possible to also achieve, or a corresponding effect can be achieved, that only deviations from a sine function associated with this speed have an effect with regard to a damping response. A theoretically ideal sine function with a constant frequency, which in fact corresponds to the assumed speed of the synchronous machine being considered, results in a fixed value at the respective inputs, i.e., at the longitudinal input 310 and transverse input 410, after the transformation into d and q components. In the case of simultaneously constant values of the transformed voltage $V_{fs/s}$ and the flux linkage mentioned, there is then also no response in the form of a corresponding current. There is only a response in the case of deviations and therefore particularly in the case of low frequency oscillations.

Explanations of equivalent circuit diagrams of a synchronous machine with a damper cage are also found in the textbook by V. Crastan, "Electrical energy supply 1, network elements, modulation, stationary behavior, measurement, switching and protection technology", $4^{th}$ edition, Springer Verlag Berlin Heidelberg, 2015, pages 247, 248.

The invention claimed is:

1. A method for damping low frequency oscillations in an electrical supply grid using at least one wind turbine or wind farm connected to the electrical supply grid, comprising:
  feeding, via a network connection point, electrical power by the at least one wind turbine or wind farm using an inverter having an inverter output;
  determining a supplementary component depending on a simplified model of a synchronous machine, wherein the simplified model is limited to emulating a subset of a plurality of properties;
  entering, into the simplified model, at least one instantaneous value of a voltage measurement at the inverter output, in the electrical supply grid or at a point between the inverter output and the electrical supply grid; and
  supplementing the feeding of the electrical power using the supplementary component for damping the low frequency oscillations,
  wherein
    the simplified model of the synchronous machine reproduces an oscillation damping property of a damper cage of the synchronous machine, and
    vibratory components of the synchronous machine on which the simplified model is based are not depicted or depicted having been attenuated.

2. The method as claimed in claim 1, wherein
  the supplementary component is a current that is fed in a supplementary manner, or
  the supplementary component is determined from damping properties of the synchronous machine, and wherein the synchronous machine is emulated at output terminals of the at least one wind turbine or wind farm.

3. The method as claimed in claim 1, comprising:
  determining the supplementary component based on a response of the simplified model to the at least one instantaneous value of the voltage measurement.

4. The method as claimed in claim 3, wherein:
  the electrical supply grid has a line frequency, and
  a generator voltage is emulated in the simplified model if the generator voltage is operated with the line frequency.

5. The method as claimed in claim 4, wherein the generator voltage is emulated for an oscillation-free operation of the synchronous machine.

6. The method as claimed in claim 1, comprising:
specifying an active power basic component; and
feeding the active power basic component using active power control independently of determining the supplementary component.

7. The method as claimed in claim 1, comprising:
determining the supplementary component depending on instantaneous values of the voltage measurement such that the supplementary component only results if the voltage measurement deviates from a sinusoidal voltage without low frequency oscillation.

8. The method as claimed in claim 1, comprising:
continually receiving a measurement voltage for three phases;
transforming the measurement voltage into d/q components for each phase;
supplying the d/q components for each phase to a d submodel and a q submodel of the simplified model, wherein the d submodel represents a behavior of a d component and the q submodel represents a behavior of a q component of the synchronous machine;
receiving or determining a d component and a q component of a current as a response of the d submodel or the q submodel to the d or q components of the measurement voltage;
transforming the d and the q components of the current into a three-phase supplementary current; and
feeding the three-phase supplementary current by the at least one wind turbine or wind farm as a supplementary component.

9. The method as claimed in claim 1, wherein:
the simplified model for an input voltage transformed into d/q components, has a longitudinal damper resistance for a d component of the transformed input voltage and a transverse damper resistance for a q component of the transformed input voltage, wherein in the simplified model:
  the d component of the transformed input voltage is applied to the longitudinal damper resistance and results in a first power loss which is received as a longitudinal power signal, and
  the q component of the transformed input voltage is applied to the transverse damper resistance and results in a second power loss which is received as a transverse power signal, and
  the supplementary component is generated from the longitudinal and transverse power signals by retransformation of the longitudinal and transverse power signals provided in d/q components into a three-phase power signal.

10. The method as claimed in claim 1, wherein the low frequency oscillations are subsynchronous resonances.

11. The method as claimed in claim 1, wherein the simplified model of the synchronous machine only reproduces one oscillation damping property of the damper cage of the synchronous machine.

12. The method as claimed in claim 1, wherein the point between the inverter output and the electrical supply grid is the network connection point.

13. A wind turbine or wind farm for feeding electrical power into an electrical supply grid and for damping low frequency oscillations in the electrical supply grid, comprising:
an inverter having an inverter output configured to feed electrical power into the electrical supply grid; and
a controller configured to:
  determine a supplementary component for damping the low frequency oscillations;
  generate a simplified model of a synchronous machine, wherein the simplified model is limited to emulating a subset of a plurality of properties;
  enter, into the simplified model, at least one instantaneous value of a voltage measurement at the inverter output, in the electrical supply grid or at a point between the inverter output and the electrical supply grid; and
  determine the supplementary component depending on the simplified model of the synchronous machine, and
wherein the inverter is configured to additionally feed the supplementary component into the electrical supply grid to damp the low frequency oscillations, and
wherein
  the simplified model of the synchronous machine reproduces an oscillation damping property of a damper cage of the synchronous machine, and
  vibratory components of the synchronous machine on which the simplified model is based are not depicted or depicted having been attenuated.

14. The wind turbine or wind farm as claimed in claim 13, wherein:
the inverter output is configured to feed into the electrical supply grid via a network connection point, and
the wind turbine or wind farm comprises a measuring device unit configured to detect the voltage measurement at the inverter output, in the electrical supply grid, or at the point between the inverter output and the electrical supply grid.

15. The wind turbine or wind farm as claimed in claim 14, wherein:
the supplementary component is determined based on at least one instantaneous value of the measurement voltage, wherein the measurement voltage is continually provided to the simplified model of the synchronous machine, and
a response of the simplified model to the instantaneous values of the measurement voltage is used as the supplementary component.

16. The wind turbine or wind farm as claimed in claim 13, wherein the controller is configured to:
transform a measurement voltage that is continually received in three phases into d/q components for determining the supplementary component,
provide the d/q components of the measurement voltage for each phase to a d submodel or a q submodel of the simplified model, wherein the d submodel depicts a behavior of a d component and the q submodel depicts a behavior of a q component of the synchronous machine,
receive or determine, for each phase, a d component and a q component of a current as a response of the d submodel or the q submodel to the d component or q component of the measurement voltage,
retransform the d and the q components of the current back into a three-phase supplementary current, and
cause the supplementary current to be additionally fed as a supplementary component.

* * * * *